United States Patent [19]

Lampert et al.

[11] Patent Number: 4,629,115
[45] Date of Patent: Dec. 16, 1986

[54] ARRANGEMENT FOR MEASURING THE QUANTITY OF HEAT GIVEN OFF BY A HEATING BODY AND FOR CONTROLLING FLUID STREAM PASSING THROUGH THE HEATING BODY

[75] Inventors: Heinz Lampert, Buchs; Bruno Scheiwiller, Winterthur, both of Switzerland

[73] Assignee: MPE Produkt Plan AG, Zurich, Switzerland

[21] Appl. No.: 703,214

[22] Filed: Feb. 15, 1985

[30] Foreign Application Priority Data

Feb. 17, 1984 [DE] Fed. Rep. of Germany ....... 3405774
Feb. 17, 1984 [DE] Fed. Rep. of Germany ....... 3405835
Feb. 17, 1984 [DE] Fed. Rep. of Germany ....... 3405840

[51] Int. Cl.$^4$ .................................................. G05D 23/00
[52] U.S. Cl. ..................................... 236/36; 165/11.1; 236/94
[58] Field of Search .................. 236/94, 80 F, 36; 165/11 R

[56] References Cited

U.S. PATENT DOCUMENTS 3,685,732  8/1972  Haskins et al. ............... 236/80 F
3,896,280  7/1975  Blake ............................ 137/554
4,412,647  11/1983  Lampert ...................... 236/94 X

FOREIGN PATENT DOCUMENTS

0018566  6/1980  European Pat. Off. .

Primary Examiner—William E. Wayner
Attorney, Agent, or Firm—Michael J. Striker

[57] ABSTRACT

An arrangement for measuring a quantity of heat given off by a heating body to a space and for simultaneously controlling a fluid stream passing through the heating body and serving as a heat carrier for regulating of the space temperature, has a volume stream regulator for allowing a constant fluid stream. An on-off valve is controlled by a signal generator for example a space thermostat via a control valve and switched by the energy of the fluid stream to block or unblock the fluid stream. A temperature sensor cooperating with the heating body and an electronic element determine the quantity of heat by integration of temperature difference values converted into an electrical value during opening times of the on-off valve. A regulating member of the volume stream regulator is formed as a diaphragm valve with a diaphragm, and a control valve of the on-off valve is associated with a bistable control member which holds a valve body of the control valve via a holding member in its end positions and is switched by an electromagnetic switching member which requires a minimal electric energy and is connected with the signal generator and the electronic unit.

31 Claims, 6 Drawing Figures

ARRANGEMENT FOR MEASURING THE QUANTITY OF HEAT GIVEN OFF BY A HEATING BODY AND FOR CONTROLLING FLUID STREAM PASSING THROUGH THE HEATING BODY

BACKGROUND OF THE INVENTION

The present invention relates to an arrangement for measuring the quantity of heat given off by a heating body to a space and for simultaneously controlling a fluid stream which passes through the heating body and serves as a heat carrier, for the purpose of regulating the space temperature.

Arrangements of the above-mentioned general type are known in the art. A known arrangement includes a volume stream regulator for allowing a constant fluid stream and an on-off valve which is precontrolled from a signal generator such as a space thermostat via control valve and switched from the energy of the fluid stream for blocking or unblocking the fluid stream as well as a temperature sensor for feed and feedback of the heating body and an electronic unit which determines the heat quantity by integration of temperature difference value converted into an electrical value during the opening times of the on-off valve. One of such arrangements is disclosed, for example, in the EP-OS No. 0018566, application Ser. No. 80 102 118.9. The known arrangement serves for controlling a fluid stream and simultaneously measuring the given off heat quantity. However, it is not accurate and expensive especially in the sense of manufacture and installation. The regulating member of the volume stream rgulator is composed of a dosing piston which slides in a cylindrical pipe. In the event of considerably dirtied heating water the sliding regulating parts can lead to errors and deviations because of corrosion and dirt deposits and finally can be clamped with one another. Also such a piston regulator requires a high working pressure because of the friction so that high pump pressures are needed. Further, the on-off valve provided with a movable valve piston can be clogged by not pure heating water, and during opening and closing of this on-off valve, leakage losses can take place so that a measuring error is produced.

SUMMARY OF THE INVENTION

Accordingly, it is an object of the present invention to provide an arrangement of the above-mentioned general type, avoids the disadvantages of the prior art.

More particularly, it is an object of the present invention to provide an arrangement of the above-mentioned general type, which is however more reliable in operation and practice, is resistant to dirtying, has a longer stable service life and is accurate, and also operates with a small working pressure and with a minimal consumption of electrical energy.

In keeping with these objects and with others which will become apparent hereinafter, one feature of the present invention resides, briefly stated, in an arrangement in which a regulating member of a volume stream regulator is formed as a diaphragm valve with a diaphragm, and a bistable adjusting member is associated with a control valve of the on-off valve which holds a valve body of the control valve via a holding member in its end position without electrical energy consumption and switches via a bistable electromagnetic switching member which requires only a minimal electrical energy and is connected with a signal generator and an electronic unit of the arrangement.

Since the regulating member of the volume stream regulator is formed as a diaphragm valve, sliding regulating parts in the fluid stream are reliably avoided, so that there is no high friction, and clamping of the regulating parts by dirtying cannot take place. The diaphragm valve can operate with very small impact pressures in a wide working region and is composed of a small number of simple structural parts. Because of the bistable adjusting member which is associated with the control valve, the movable valve body of the control valve is held without electrical energy consumption via the holding member reliably in its both positions, so that the electromagnetic switching member of the bistable adjusting member performs only the switching over of the smaller control valve body. For switching the on-off valve, the energy of the fluid is used so that a very little electrical energy is required for starting the adjusting impulse for the switching of the on-off valve and a long operation of the device is possible with a small auxiliary batteries which also supply the electronic unit.

By the connection of the electromagnetic switching member with the signal generator and the electronic unit, the reaction of the electromagnetic switching member particularly from a space temperature sensor can be easily regulated by comparison between the adjusted nominal value and the actual value in connection with a time control.

In accordance with another feature of the present invention, the volume stream regulator is provided with at least one further diaphragm valve with a diaphragm and arranged as a cascade to the first diaphragm valve in series with the same in a common housing, and a throttle is associated with the regulating member. In this construction a high accuracy is obtained, wherein the first diaphragm valve serves for coarse regulation and the second diaphragm valve or also further steps act for a fine regulation. Therefore, the fluid stream can be always maintained reliably on the desired constant through flow value regardless of high pressure variations in the conduit network.

In accordance with still another feature of the present invention the on-off valve is formed as a diaphragm valve, and both diaphragm valves of the volume stream regulator together with the diaphragm valve of the on-off valve are arranged one behind the other in a common through-flow housing so as to form a compact arrangement located in a single housing. This housing also carries in an integrated manner both the hydraulic elements for the heat quantity measurement and also for the regulation of the heat quantity given off by the fluid stream. These three diaphragm valves can have a very simple construction and be arranged in the housing one above the other, while at the same for the displacement of the easily movable diaphragms of a large surface only small displacement forces are required.

A further feature of the present invention is that the throughflow quantity which passes through the volume stream regulator is adjustable by a variable or exchangeable throttle, and the adjustable throughflow quantity of the fluid is taken into consideration in the electronic unit positively or by adjustment in coded form during the heat quantity measurement. This makes possible to adjust to the fluid stream passing through the heating body in correspondence with the used throttle or the throttle adjustment of the respective supplied heat generation, and simultaneously the adjusted throughflow quantity is transferred to the electronic unit so that the correct throughflow quantity is available for the heat quantity measurement.

Advantageously the pressure difference at the subsequently connected diaphragm valve of the volume stream regulator is formed by the preceding diaphragm valve acting as a throttle so that a variable reference pressure is obtained as control basis for the fine regulation.

The diaphragm valves of the volume stream regulator and the on-off valve with the control valve and the bistable adjusting member can be assembled to a compact valve unit with heating body connections and, instead of a conventional heating body valve, be incorporated in a heating body conduit. The valve unit can hold a valve housing which accommodates the electronic unit and the indicating, adjusting and presetting elements.

Advantageously the regulation of the fluid stream and thereby the space temperature is performed by an adjustable thermostat which starts the opening and closing of the on-off valve and is connected with a regulating device of the electronic unit.

When the command value or the nominal value of the thermostat is changeable over the time in accordance with a predetermined value, the nominal value of the thermostat can be controlled automatically in dependence on the time of the regulating device of the electronic unit to the predetermined value. Also, different delivery programs can be preprogrammed in accordance with the selection made by a consumer, or a delivery program can be assembled from partial programs by a consumer with a microprocessor provided in the electronic unit.

Solar cells or semi-conductor thermal elements for converting the energy in the fluid stream into electrical energy can be used for energy supply of the device. Therefore auxiliary batteries can be dispensed with.

A stream indicator can be provided in the arrangement to produce a signal indicating a stream or a flow stoppage to be delivered to the electronic unit. With this stream indicator the integration of the temperature difference value of the temperature sensor during recording a stream can be started, and during recording of a fluid stoppage for example during closing of the on-off valve, can be again stopped. Therefore the heat quantity can be determined in a simple manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
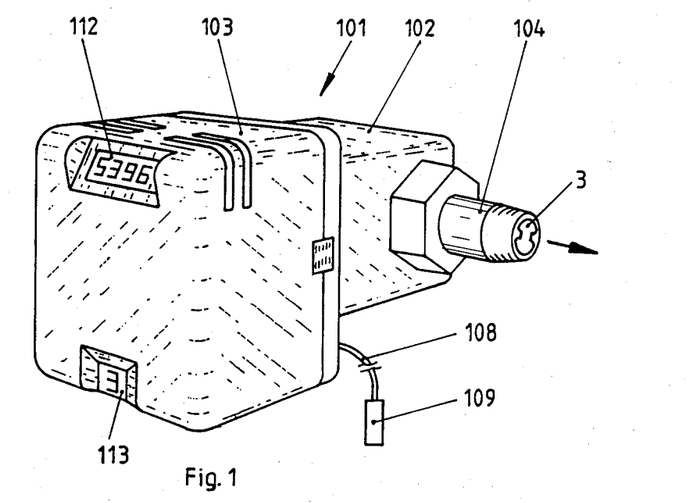
FIG. 1 is a view of an arrangement in accordance with one embodiment of the present invention.
Figure 2:
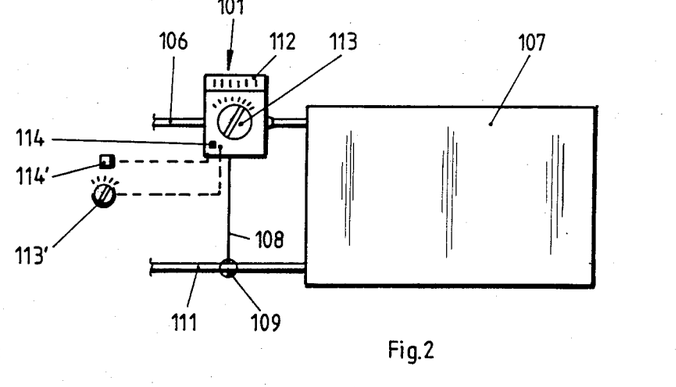
FIG. 2 is a view illustrating the installation of the inventive arrangement on a heating body.

An arrangement in accordance with the present invention is composed of a compact unit 101 with a throughflow housing 102. A fluid stream flows through the throughflow housing 102, and mechanical parts particularly valve elements and electromagnetic parts of the inventive arrangement are accommodated in the housing. The unit 101 has further a housing part 103 with electronic means, and indicating, adjusting and presetting elements in it. The throughflow housing 102 has two connections 104 for an inlet and an outlet, for connecting the inventive arrangement with a feed conduit 106 to a heating body 107 of a heating device as well as a conventional valve, as shown in FIG. 2. Only one connection 104 for the outlet is shown in FIG. 1.

The unit 101 has a conduit 108 with an electrical temperature sensor 109 arranged at its end and formed, for example, as a clamp or the like to be mounted on a feedback conduit 111 of the heating body 107. A further temperature sensor which is not shown in the drawing is arranged in the housing 102 and directly measures the feed temperature in the conduit 106 to the heating body 107. Various temperature sensors can be used, such as for example resistance thermometers, thermal elements or advantageously electronic current sensors which generate a current signal proportional to the absolute temperature and which can be connected in series so as to produce directly a current signal proportional to the temperature difference between the feed in the feed conduit and the feedback in the feedback conduit 111. It is possible in some cases with the aid of active thermal elements such as Peltier elements possibly with the use of buffer accumulators, to recover the energy for the electronic circuitry of the inventive arrangement from the thermal energy of the liquid stream to be measured, as known in the art.

The housing part 103 which accommodates the electronic circuitry has an indicator 112 for indicating and reading the energy consumed in the heating body 107 or given out by the latter, for example, in comparison units. An adjusting device 113 of a thermostat is provided for adjusting or preselecting the nominal space temperature or the course of the nominal temperature over the time. A space temperature sensor 114 is integrated in the housing part 103 and measures an actual temperature of the space which is compared with the instantaneous nominal temperature for controlling the throughflow through the throughflow housing 102 to the heating body 107. In addition to the adjusting device 113 integrated in the housing part, also a remote nominal value adjusting device 113' and/or a remote sensor 114' can be provided, as shown schematically in FIG. 2.

Figure 3:
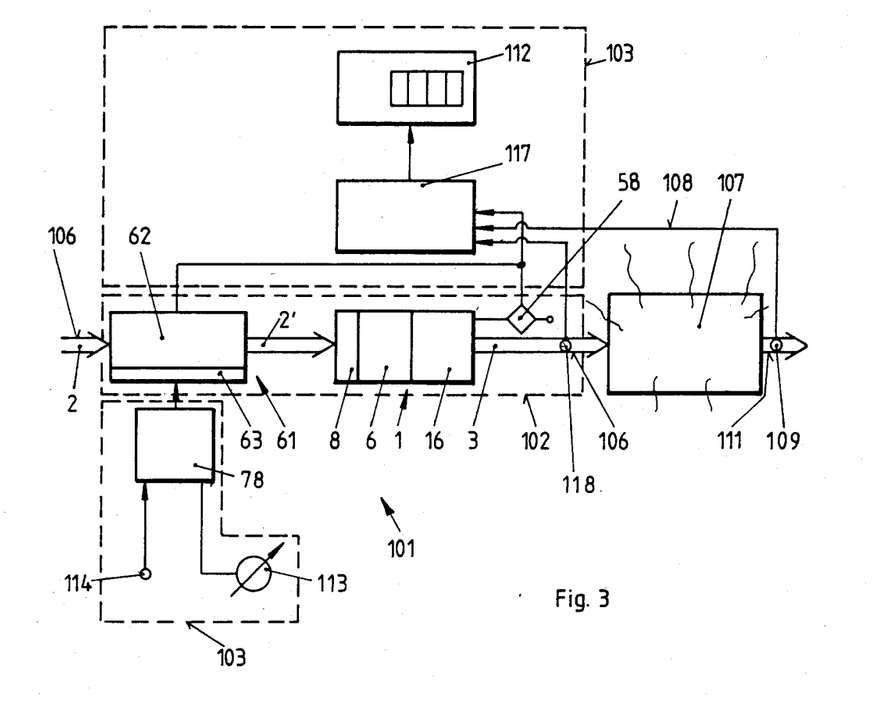
FIG. 3 is a view showing a block diagram of the inventive arrangement.

FIG. 3 shows a block diagram of the inventive arrangement 101. A valve system 61 for blocking and unblocking the fluid stream is arranged in the feed conduit 106 to the heating body 107 in the joint throughflow housing 102 for the fluid. The valve system 61 has a main valve 62 formed as an on-off valve, and a control part 63. The control part 63 is regulated by a regulating device 70 in dependence on a comparison in it between the actual command value or the actual nominal value adjusted by the adjusting device 113 and the actual value of the space temperature sensor 114. Instead of the adjusting device 113 and the space temperature sensor 114, another control impulse, for example of a time program can be given. The circuit of the fluid stream is explained in detail hereinbelow. The volume stream regulator 1 is arranged after the valve system 61 and provides, after adjustment via an adjustable throttle 8 with the aid of a regulating stage 6 and a subsequent compensating stage or cascade 16 an always constant quantity stream or volume stream to the outlet 3 and thereby to the heating body 107.

A stream indicator 58 is further provided in the throughflow housing 102 for determining whether the fluid stream regulated by the volume stream regulator takes place in the feed conduit 106, or the fluid stream is interrupted by the valve system 61. The information measured by the stream indicator 58 is supplied to an electronic unit 117 in the housing part 103. The same is true with respect to the temperature in the feedback conduit 111 or the feed conduit 106 to the heating body 107, measured by the temperature sensors 109 and 118. The thus obtained information is then processed, with the consideration of the throttle adjustment or in other words of the given throughflow quantity, for example in coded form in the electronic unit 117. The result or the addition of the measurements is indicated then on the indicator 112. As a whole, the inventive arrangement 101 determines the energy quantities which are given off through an individual consumer, here the heating body 107, and the given off energy quantities are regulated by the regulator 78 or controlled in a predetermined manner.

Figure 4:
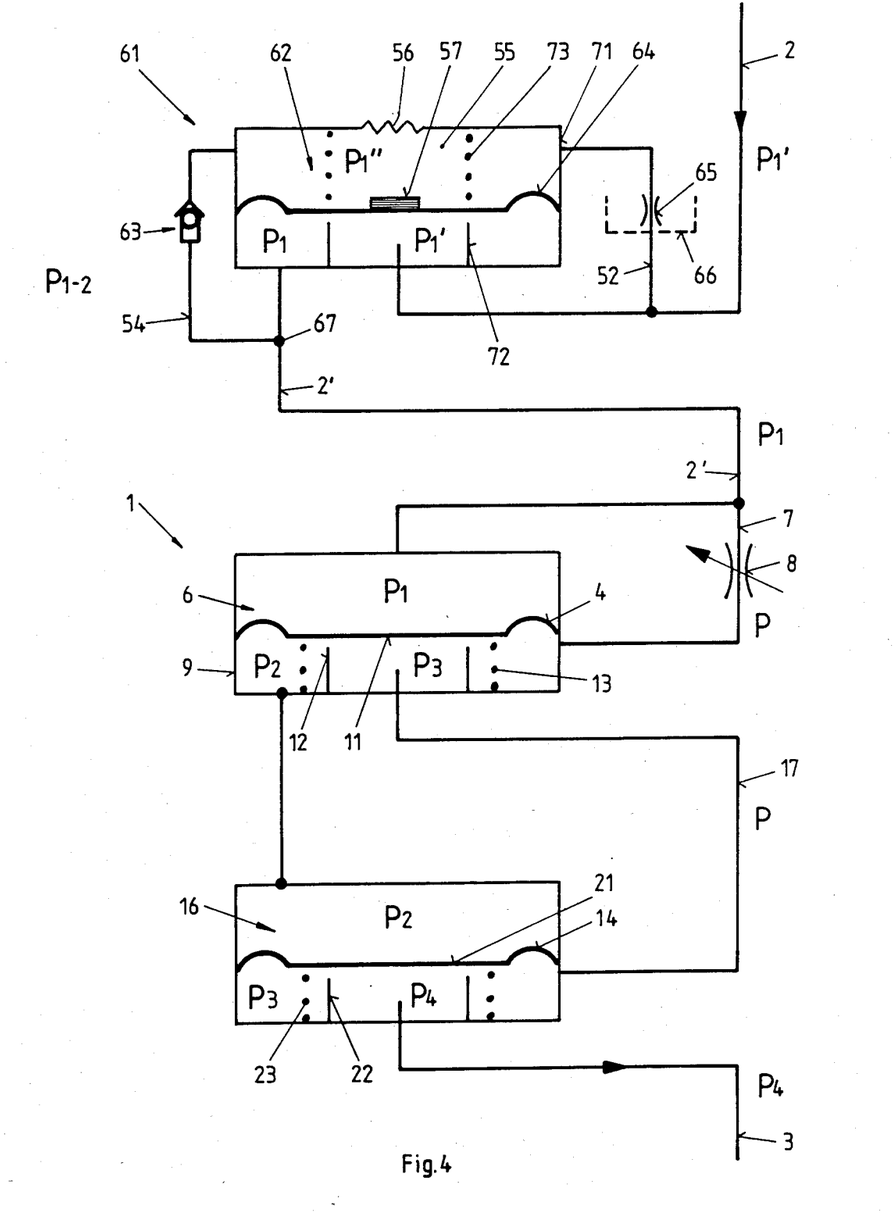
FIG. 4 is a view schematically showing the inventive arrangement.

The mechanical and electromagnetic control units accommodated in the throughflow housing 102 are schematically shown in FIG. 4. The valve unit 61 for blocking and unblocking a fluid stream in a heating device with its main valve 62 formed as an on-off valve and its control part 63 with a control valve is shown in principle in FIG. 4. The main valve 62 has a diaphragm 64 which is fixed with its peripheral edge in the wall of an outer housing or an insert not shown in FIG. 4. The diaphragm 64 is, however, elastic in an annular region of a crimped zone M shown in FIG. 5, and is therefore formed as a diaphragm proper. In the center region of its supporting zone it has a rigid plate-shaped valve cover 71. A ring-shaped valve seat 72 is associated with or lies against the valve cover 71 at a diaphragm side facing toward an inlet 49. The valve cover 71 is pressed by a ring or spiral spring 73 against the valve seat 72. When the valve cover 71 abuts against the valve seat 72, the main valve 62 is closed and there is no fluid stream from the inlet 2 to the outlet 2' to the volume current regulator 1.

A bypass or an auxiliary conduit or connection 52 extends in front of the inlet 2 to a space 55 at the diaphragm side facing away of the valve seat 72. Similarly, an auxiliary conduit 54 leads from the space 55 to the outlet 2'. The auxiliary conduit 54 can be formed as a passage through the valve cover 71 and provided with an aperture 65 connected with a filter 66. The control valve 63 located in the auxiliary conduit 54 has a valve which can open or close the auxiliary conduit 54 from the space 55 to the outlet 2'. An injector-type connection 67 of the connecting or auxiliary conduit 54 to the outlet 2' is such that with a fluid flow from the inlet 2 through the main valve 62 to the outlet 2' the liquid located in the auxiliary conduit 54 is entrained in accordance with the injector principle, and thereby a negative pressure is produced in the conduit 54 and with the open control valve 63 in the space 55.

When the valve unit 61 and thereby especially the main valve 62 is closed, a pressure P1' before the main valve 62, and a pressure P1 at the outlet 2' is formed, wherein the pressure P1 is smaller than the pressure P1'. In this closed condition, the control valve 63 is closed. The pressure P1'' in the space 65 is equalized via the aperture 65 with the pressure P1' in the inlet 2. In addition to a spring force 73 also the pressure P1'' acts at the diaphragm side which faces away of the valve seat 72. The pressure P1' and P1 act on respective partial surfaces of the diaphragm at the diaphragm side facing toward the valve seat 72. Since P1 is a lowest pressure of the valve unit 61, the forces which act from the space 55 onto the membrane 64 are always higher than at the side of the valve seat 72, so that the valve in this case remains closed.

When now by an adjusting impulse the control part 63 with the control valve opens as will be explained in detail hereinbelow, the pressure P1'' in the chamber 55 decreases and approaches with a small pressure drop the pressure P1 at the outlet 2'. Because of the aperture 65 with a smaller cross-section than the passage 76 shown in FIG. 5, the chamber 55 cannot be filled sufficiently fast via the auxiliary conduit 52, so that a pressure difference between the inlet 2 with the pressure P1' and the chamber 55 with the pressure P1'' is produced. Thereby the pressure P1' even with a small pressure difference P1'−P1'' can push the valve cover 71 from the valve seat 72 and thereby open the main valve 62. By the injector-like connection 67 of the auxiliary conduit 54 with the outlet 2', the pressure P1'' in the space 55 can become smaller than the pressure P1 in the outlet 2', so that after opening of the on-off valve 62, it remains reliably open or is held open.

For closing of the valve system 61 and thereby interruption of a liquid stream from the inlet to the outlet 2', the control valve of the control part 63 is closed by an impulse. Therefore, an impact pressure takes place in the chamber 55 by the available pressure difference between the inlet 2 with the pressure P1' and the smaller pressure P1'' in the chamber 55. Thereby after some time, the pressure P1'' in the chamber 55 becomes closer to the pressure P1' through the opening 65, until the forces of the pressure P1'' in the chamber 55 and the spring 73 exceed the oppositely acting force of the pressure P1' in the inlet 2 and P1 in the outlet 2' on the diaphragm 64 and thereby the main valve 62 is closed as mentioned above. The spring 73 serves as a differential force, also when no flow is available. Moreover, the spring 73 prevents a vibration of the diaphragm 64.

In the shown embodiment, the flow indicator in the valve system 61 for blocking and unblocking of the fluid stream is formed as a contactless or proximity switch which determines presence or absence of a fluid flow. A so-called read-switch 56 is arranged in the shown embodiment above the valve diaphragm 64. A permanent magnet 57 is located in the center of the diaphragm 64 or its diaphragm cover. Because of changes in its distance from the read-switch 56 with the movement of the diaphragm 64, the permanent magnet 57 switches the read-switch 56. The outlet 2' of the valve system 61 leads as an inlet 2' to the volume current regulator 1 with its regulating step 6 and compensating step or cascade 16. With the open valve system 61, a constant throughflow must take place from the inlet 2 or inlet 2' of the volume current regulator 1 to the outlet 3, independently of the pressure difference between the inlet and outlet. The inlet 2' leads to one side of the diaphragm 4 of the diaphragm valve identified as regulating step 6. The diaphragm 4 is loaded thereby at its side facing toward the inlet with the pressure P1 which acts at this side. A branch 7 leads via an adjustable throttle 8 which reduces the pressure P1 to a pressure P2, to another side of the diaphragm 4 of the regulating step 6.

The regulating step 6 has the substantially flat diaphragm 4 which is connected with its peripheral edge to the wall of a cartridge 9 insertable into an outer housing which is not shown in the drawing. The diaphragm 4 is formed elastically in an annular region and thereby performs the functions of a diaphragm. In a central region it is provided with the rigid plate-shaped valve cover 11. The ring-shaped valve seat 12 is associated with or lies against the valve cover 11 at the diaphragm side facing away of the inlet 2'. The valve seat 12 is fixedly connected with the cartridge 9. The valve seat 12 surrounds only a small surface of the entire surface covered by the cartridge. The valve cover 11 is pressed by a spring 13 located opposite to the valve seat 12 from the valve seat 12. The available opening between the valve cover 11 and the valve seat 12 acts as a variable throttle, so that inside a space limited by the valve seat 12 there acts a pressure P3 which is lower than the pressure P2. Forces which are determined by the pressure P2 and P3 and their associated surfaces act at the diaphragm side facing away of the feed. The regulating step 6 is connected in series with a further diaphragm valve identified as cascade 16. It is to be understood that when the cascade 16 is shown similar to the regulating step 6, its dimensions can deviate from the dimensions of the regulating step 6.

The cascade 16 has, similarly to the regulating step 6 a diaphragm 14 with a diaphragm cover 21 associated with a valve seat 22 from which the diaphragm cover 21 is pressed by a spring 23 under respective pressure conditions. The space of the valve 16, which faces away of the spring 23 and the valve seat 22 is directly connected with the space at the membrane side which faces toward its spring 12 and its valve seat and in which the pressure P2 acts so that this pressure P2 also acts in the above-mentioned space of the cascade 16. A connection 17 leads from the inner side of the ring-shaped valve seat 12 to the space which is surrounded by the valve seat 22 of the cascade 16 and provided at the diaphragm side facing toward the valve seat 22. Therefore the same pressure as inside the valve seat 12, that is the pressure P3 acts in this outer space. The regulating valve 6 acts as a variable throttle for the cascade 16 in correspondence with the adjustable throttle 8 for the regulating step 6.

The same pressure P4 as inside the valve seat 22 acts at the outlet 3 of the volume stream regulator 1 in the shown embodiment as long as between the outlet 3 and the valve seat 22 there are no adjustable throttles or further cascades corresponding to the cascade 16. The adjustable throttle 8 can be composed of a fixed aperture part which can be displaced relative to a displaceable aperture part so that together they form a variable aperture with advantageously sharp-edged shape. Especially advantageous is the aperture with substantially round contours which forms in the event of small apertures a circular opening, or in other words a large surface with small and round periphery. The resulting minimum contour can for example be circular or half-square. With the sharp-cornered and possibly circular shape of the aperture a change in the aperture surface because of dirt deposit is prevented. Instead of the displaceable throttle, also exchangeable circular insert apertures can be provided. This makes possible only with one type of regulating unit and different insert apertures, to have available a wide selection of volume stream regulators with different throughflow values.

Figure 5:
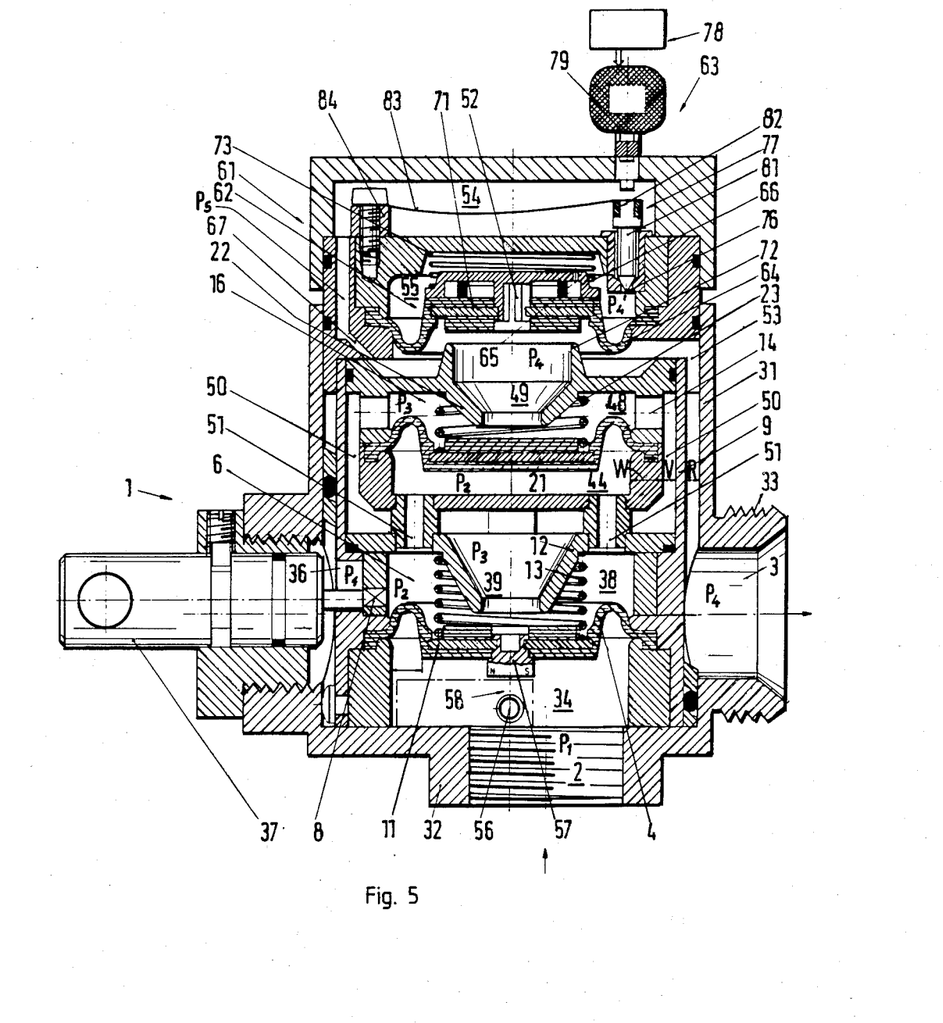
FIG. 5 is a longitudinal section along one embodiment of a throughflow housing of the inventive arrangement.

Reference is now made to FIG. 5. This figure shows a compact embodiment of the inventive arrangement with the volume stream regulator 1 and the integrated bistable on-off valve system 61 in a longitudinal section. The entire unit is mounted on an outer housing 31 which has a connecting pipe 32 for the inlet 2 and a connecting pipe 33 for the outlet 3. The valve devices 6 and 16 of the volume stream regulator 1 as well as the valve system 61 are arranged in the cartridge 9 inserted in the housing 31.

The inlet 2 leads to a chamber 34. The diaphragm 4 of the diaphragm valve 6 is arranged opposite to the inlet 2. The diaphragm 4 is fixedly clamped with its periphery in the cartridge 9, whereas its central part is formed as the rigid valve cover 11. The valve seat 12 is provided at the valve cover side which faces away of the chamber 34 and is also fixedly arranged in the cartridge 9. The valve seat 12 is shown as a truncated cone and narrows toward the valve cover 11. The spring 13 can abut thereby against the widest part of the valve seat 12 without limiting its movement because of the danger of a contact in the Z region at the valve seat. The spring 13 presses with its side facing away of the valve seat 12, against the valve cover 11 and holds the valve open in pressureless condition. The chamber 34 is connected through a not shown passage with a lateral chamber 36 so that the same pressure P1 acts in the chamber 36 as in the chamber 34. The chamber 36 is connected via the throttle 8 outwardly adjustable by a handle 37 with a ring chamber 38 which surrounds the valve seat 12 for fluid communication. A pressure P2 which is smaller than the pressure P1 acts in the ring chamber 38. Depending on the degree of opening of the valve 6 because of the actual pressure conditions, a pressure P3 which is smaller than the pressure P2 acts in an inner chamber 39 of the valve seat 12, the inner chamber being limited relative the ring chamber 38 by the valve seat 12. The further diaphragm valve 16 is arranged above the diaphragm valve 6. Because of the design of the valves as diaphragm valves, a compact arrangement with a smaller strutural height is provided. The diaphragm valve 16 has the diaphragm 14 which is also clamped with its outer edge via the parts fixedly connected with the cartridge 9, and has in its central region the valve cover 21. The diaphragm 14 separates a chamber 44 from a ring chamber 48. The ring chamber 48 surrounds at least over a partial region, the truncated cone-shaped valve seat 22 which has an inner space 49. The outer region of the valve seat 22 serves in a respective manner as an abutment for the spring 23 which abuts with its other end against the valve cover 21 and presses the valve cover from the valve seat 22 in pressureless condition.

The chamber 44 is connected via a passage 51 with the ring chamber 38, whereas the inner chamber 39 of the valve seat 19 is connected with the ring chamber 48 above the diaphragm 14 via a connecting region 50. The inner space 49 limited by the valve seat 22 opposite to the ring chamber 48 has a pressure P4 which is smaller than the pressure P3 in the ring chamber 48. It is connected with the outlet 3 of the housing 31 via the on-off valve system 61 and via an intermediate space 53 located outside the cartridge, particularly between the outer wall of the cartridge 9 and the inner side of the wall of the housing 31. In the inventive volume stream regulator the contactless or proximity switch 58 is integrated as a stream indicator. The reed-switch 56 is arranged under the valve cover 11. The permanent magnet 57 is inserted in the center of the valve cover 11 and switches the reed-switch 56 because of the change of its distance to the reed-switch 56 with the movement of the valve cover 11.

The entire valve unit 61 is mounted in the joint housing 31. The inlet space 49 is surrounded by a valve seat 72 which is also surrounded by part of the passage 53 in form of a ring channel. A diaphragm 64 is associated with a valve cover 71 via the valve seat 72. It is pressed by a spring 73 against the valve seat 72. As can be seen from FIG. 5, the auxiliary conduit 52 from the inlet 49 to the chamber 55 has an opening 65 arranged in the valve cover 71 and connected with the filter 66. A smaller passage 77 leads from the chamber 55 to the auxiliary conduit 54 of FIG. 4 and is formed in the embodiment of FIG. 5 as a further chamber 54 and as ring chamber before the injector connection 67.

The control part 63 with a control valve 77 including the passage 76 is designed in accordance with the invention as follows. The control part 63 has a regulating device 78 whose control impulse Y determined for example by temperature change which exceeding and falling below certain temperature limits or other signals, act on a magnetic system 79 which is advantageously bistable. A valve piston 81 is moved by the bistable magnetic system 79 via an armature 82 mounted thereon so that the passage 76 is either closed or opened. When a plunger 81 is located in its lower position, the passage 76 and thereby the control valve 77 are closed, and when the plunger 81 with the armature 88 are located in their other position, the passage 76 and thereby the control valve 77 are open. Thereby the magnetic system must take less energy and particularly for switching, not however for holding of the plunger 81 in both positions. For this purpose the piston or plunger 81 is connected with an auxiliary spring 83 which is fixed at its end opposite to the piston 81, on a holder 84. The auxiliary spring 83 has the function to press the control valve 77 in the closed condition with a sufficient force of several gram against the valve seat and thereby to tightly hold the same. In principle this function can be performed without an auxiliary spring, for example by a small permanent magnet on the passage 76, which pulls a ferromagnetically formed plunger 81 to the valve seat. The control valve 77 or the plunger 81 in their both positions, open and closed positions, can be held by a small permanent magnet and switched upwardly or downwardly by the magnetic pulse of both directions of the electromagnetic system. The auxiliary spring 83 can be formed as a snap spring with two bistable positions which corresponds to the opening and closing position of the control valve 77. When the control valve 77 is in one of its both positions, namely either in the closing position or in the opening position, and helped in this position by the snap spring 83, the magnetic system 79 must overcome the holding force 83 for switching. When the magnetic system does it, the spring 83 snaps to its another bistable position and bring the control valve 77 to its another position, namely from the opening position to the closing position or from the closing position to the opening position.

For guaranteeing the holding function of the valve 77 in both positions by either auxiliary springs, snap spring or permanent magnet, the magnet switching member 79 requires energy for switching, not for holding the control valve 77 in one of both positions. The entire energy consumption is so small that such bistable heating valve with two inexpensive auxiliary batteries of the size LR6 can be used for operation over one year. The switching of the entire valve system 71 is performed in a manner described in FIG. 4, so that no further explanations are required.

Figure 6:
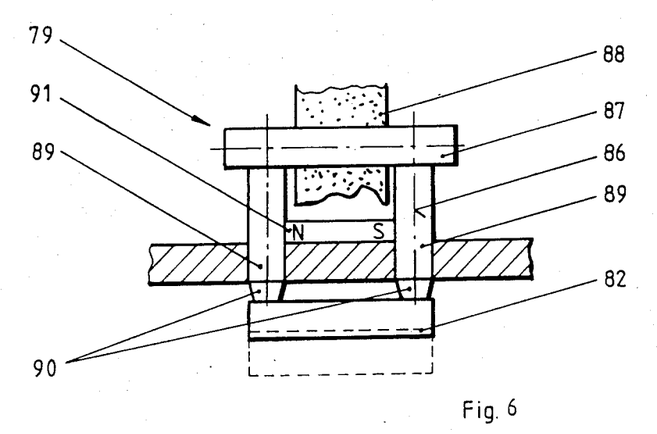
FIG. 6 is a view showing a magnetic system of the inventive arrangement.

One embodiment of a bistable magnetic system 79 is shown in FIG. 6. The magnet switching member 79 has a magnetic circuit with a U-shaped yoke 86 and a movable armature 82 which is connected with the piston 81 of FIG. 5. A web 87 of the yoke 86 is surrounded in a conventional manner by an energizing coil 88. While the yoke 86 is composed of weak magnetic material, a permanent magnet 91 is inserted between legs 89 of the weak-magnetic yoke 86. The magnetic field and force relations are selected so that the permanent magnet 91 is reliably held via both legs 89 of the yoke 86 and not switched energizing coil 86 reliably holds the armature 82 with the valve piston 81 in the position shown in solid lines in FIG. 6, but no more in a position shown in broken lines. When a magnetic field counteracting the magnetic circuit formed by the permanent magnets via the armature is switched by switching of the energizing coil 88 acting as a displacement field relative to the field of the permanent magnets, the armature moves downwardly from the yoke 89. In the construction with the auxiliary spring the displacement field can overcome the permanent magnet field so that the auxiliary spring 83 is pressed to its closed position corresponding to the closing position of the valve 77. In principle it is sufficient that in addition to the above-mentioned magnetic field, the weight force acts on the armature 82.

When a field which increases the permanent magnet field is switched, the armature is pulled from the closing position shown in the broken lines to the open position shown in solid lines in FIG. 6. The force of a snapping or conventional spring and/or the weight force are overcome and the armature in each case with switched-off energizing coil 88 is held in its upper position shown in solid lines in FIG. 6. The legs 89 have a cross-section constriction 90 for magnetic field reinforcement.

It has been determined that bistable control parts can also have, for example, magnetic and mechanical bistable parts or a mechanical bistable element (snapping spring) with a conventional magnetic system or a bistable magnetic system with a one-direction acting mechanical force (conventional spring, weight force), wherein the above-mentioned embodiments are advantageous. With the shown bistable control part 63, the operation of the valve system 61 can be performed so that for switching, low switching energies are required which can be obtained with the switching conditions but without energy consumption. The complete guidelines are provided hereinbelow for advantageous construction of on-off valve system 61.

The aperture 65 which is also called a borehole must be retained as small as possible, for example, with a diameter of 0.5 mm advantageously between 0.3 and 0.6 mm, so that only small liquid quantities can flow therethrough. The aperture 65 must not be, however, completely clogged by dirt deposits. For this purpose it is first of all, of a circular shape and provided with sharp blade-like aperture edges wherein no deposits can form.

In addition, a fine filter 66 is located before the aperture 65. This filter 66 has a large surface as compared with small throughflow quantity of liquid so that over a very long time it cannot be completely stopped because of dirtying. Advantageously, the filter can be subdivided into two zones with one zone with a flow and the other zone without it. In the first zone a certain self-cleaning is obtained by the stream, whereas in the second zone because of the fast decrease of the stream speed, correspondingly lower dirtying on the filter takes place. The first zone of the filter is advantageously arranged above, so that the heavier parts of dirt no longer can be entrained. Depending on the type of dirt, one or the other zone can be formed as less dirt-susceptible. Both zones are however of such size that they guarantee a sufficient throughflow for many years for the small nozzle 65.

The filter 66 can be provided with a construction with many folds for increasing the filter surface to small volumes. The filter is composed of a not ferromagnetic material for example of synthetic fabric or bronze. It can be a very thin sintered filter or a filter fabric. The pore size of the filter is advantageously 5–10 times smaller than the filter opening. The dimensions of the passage 76 at the control valve 77 must be selected considerably greater than the aperture 65. The diameter of the passage 76 lies advantageously between 1 and 2 mm, so that for example a surface ratio of the passage 76 to the aperture 65 is from 5 to 10. It is to be understood from hereinabove, that with maintaining a compact construction the connected arrangement of the on-off valve system 61 and the volume stream regulator can be exchanged. Also, the current sensor 65 can be arranged in any manner.

The regulation of the throughflow of the liquid to and through the heating body 107 and the maintenance of the throughflow quantity constant with open on-off valve system 61 is performed in the following manner:

A nominal temperature valve for the space in which the heating body 107 is inserted or a program for the nominal temperature is selected via an adjusting device 113. The actual value of the space temperature is measured in the regulator 78 by a space temperature sensor 114 and compared with the nominal value. When the actual value changes over the instantaneous nominal value, the regulator delivers a switching impulse and particularly an opening impulse to the valve system 61 when the actual value decreases below the nominal value and a closing impulse when the actual value increases above the nominal value. When the main valve 62 of the valve system 61 is opened by an adjusting impulse of the regulator 78 in the above-described manner as shown in FIG. 4, and thereby the path from the space 49 to the ring passage 53 of FIG. 5 is released, the volume stream regulator 1 operates in the following manner.

When the chamber 34 is pressureless since no fluid is supplied via the inlet 2, the diaphragm valve 6 is located in its completely open position because the diaphragm 4 is pressed under exclusive action of the spring 13 from the valve seat 12. In the operational conditions a system pressure P1 builds in front of the volume stream regulator. After the volume stream regulator, a pressure P4 takes place which is determined by the working resistance at the consumer. With variable working resistance and variable system pressure the pressure drop between P1 and P4 can change. Presumption for the constant throughflow is a constant pressure drop at the adjustable reference throttle 8, wherein for obtaining the desired nominal throughflow a minimum operative pressure or pressure threshold value is required. When the working pressure is greater, the effective pressure must be eliminated by throttling in the regulating step 6 and the cascade 16, so that the throughflow remains constant within a small tolerance or error region.

When no stream is available at the valve, no pressure acts on the diaphragm 4, so that the regulatable throttle points 6, 16 are open. The diaphragm 4, 14 is pressed by the springs 13, 23 from the respective valve seat 12, 22. With the introduction of a stream and decrease of the system pressure P1 in the inlet 2, the diaphragm 4 is pressed further against the valve seat 12. Simultaneously the liquid flows via the adjustable reference throttle 8 into the ring chamber 38 in which a pressure P2 is set and from this chamber flows into the inner chamber 39 inside the valve seat 12 via the valve opening between the valve cover 11 and the valve seat 12 wherein then a pressure P3 is formed. The forces which act on the diaphragm 4 because of the pressures P2 and P3 counteract the force corresponding to the pressure P1 until the diaphragm 4 acting as a pressure equilization is adjusted so that the changes of the pressure drop P2–P3 correspond to the change of P1–P3 and thereby the pressure drop P1–P2 at the adjusting throttle remains approximately constant. The differential pressure P2–P3 determines an interference factor, so that the above-mentioned pressure difference must be further reduced when it exceeds the throughflow tolerances. The further diaphragm valve or the cascade 16 serves for this purpose. Here the reference pressure is variable since from the above-mentioned regulating step 6 the difference pressure P2–P3 is a control basis. The pressure difference P3–P2 adjusting via the valve 16 is then smaller, so that a sufficient throughflow constancy can be obtained. In general, one cascade is sufficient. In several cases also further cascades behind the cascade 16 can be arranged.

In accordance with the invention, the two or multi-stage arrangement of the diaphragm valves provide for a volume stream regulator which is very accurate, is stable over a long time, resistant to dirtying and has a compact construction. It can work in broad operational region. The nominal throughflow quantity is selectable by the adjustable throttle 8, 37.

For restraining coarse impurities in hot water, an exchangeable filter can be provided in the inlet. This filter can be formed, for example, as a bronze grating with mesh value 0.2 mm. Fine impurities do not undesirably affect the operation of the volume stream regulator.

The diaphragms 4, 14 are formed, for example, substantially flat, or in other words, they have a relatively small crimped zone M and a relatively big supporting surface therebetween (with valve cover). Moreover, the diaphragms must have a very low stiffness of advantageously lower than 3 gram/cm$^2$ and a big stroke region. This is true for all rolled diaphragms corrugated diaphragms, or bulged flat diaphragms. EPDM and Viton with hardness of 65°–70° Shore and thickness of for example 0.2–0.4 mm are suitable as a material for the diaphragms. When high overpressures must be taken into consideration, the diaphragms can be reinforced with a fabric insert.

The best results are obtained with maximum large diaphragm surfaces, and because of this the diaphragm diameter must advantageously be at least 70% of the diameter of the cartridge or the inner diameter of the housing 31. The openings of the valve seat 12, 22 must be relatively small for obtaining a high regulating accuracy on the one hand, but the flow resistance at the valve must not be too high. Good results can be obtained when the valve diameter amounts to between 35 and 45% of the diaphragm diameter.

For obtaining the desired high throughflow quantities and low threshold value of the working pressure, the flow resistance must further be retained low. For this purpose, with given housing diameter, the dimensions of the diaphragm and feed and discharge passages must be maintained great and the wall thickness including the wall thickness W for the clamping region of the membranes must be retained small. For this purpose the diaphragm, instead of showing in FIG. 5, can be clamped, glued or vulcanized with its bead also in a thin wall W. Over the entire stream path through the volume stream regulator the limiting walls must be formed without edges or corners, as smooth as possible, round and continuous with the exception of the required sharp edged apertures. Instead of the concentric feed and discharge passages 50 and 53, with the diameters V and R a radial subdivision can be provided so that the passages 50 and 53 in the section shown in FIG. 5, can be arranged not near one another, but instead one above the other. The shape of the outer housing 31 can also be square so that in the corners not covered by the circular diaphragms there is a place available for the passages 50 and 53. When the volume stream regulator is designed in accordance with the above listed features, the following very good results can be obtained, for example with a $\frac{3}{8}$ inch valve and standard connections:

threshold value of the working pressure of lower than 0.1 bar;
volume stream of at least 20 l/h;
accuracies of 10% over a very wide working region up to pressures of above 1 bar.

Depending on the desired application, the construction of the inventive arrangement can be optimized in accordance with the above presented guidelines.

For selection of the material it is necessary to take care that the different elements be electrochemically and chemically resistant, in other words, they do not chemically react in the fluid stream and relative to the surrounding housing and conduits. For example, in the housing of messing, the valve springs 13 and 2 are composed of a spring bronze or acid-resistance steel.

Instead of the ring springs of FIG. 5 also other springs such as leaf spring or torsion springs can be used. It is advantageous to use compact copper springs which are favorable for small height of the housing and short connecting passages. The spring can be also integrated in the diaphragm.

Regardless of whether the stream indicator 58 determines a stream or not, the temperature difference is measured by the thermal sensor 109, 118 and multiplied in the electronic unit 117 with the coded adjustment of the throughflow quantity via the throttle 8 and integrated or added over the opening time of the valve system 61, so that the added energy consumption in relative or absolute values can be indicated by the indicator 112 in FIG. 3. The electronic processing is performed for example with the use of current sensors, such as LM234 connected in series and delivering a current signal proportional to the temperature difference, wherein the current signal is converted by a condenser impulse or further processed and added by A-D converter.

It will be understood that each of the elements described above, or two or more together, may also find a useful application in other types of constructions differing from the types described above.

While the invention has been illustrated and described as embodied in an arrangement for measuring heat given off by a heating body into a space and simultaneous controlling a heat carrier flowing through the heating body, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for measuring the quantity of heat given off by a heating body to a space and for simultaneously controlling a fluid stream which flows through the heating body and serves as a heat carrier, for the purpose of regulating of the space temperature, the arrangement comprising a volume stream regulator for allowing a constant fluid stream and having a regulating member; a signal generator; a control valve having a valve body; an on-off valve precontrolled by said signal generator via said control valve and switched by the energy of the fluid stream, for blocking or unblocking the fluid stream; a temperature sensor sensing the inlet and outlets to and from the heating body respectively; an electronic unit which determines the quantity of heat by integration of a temperature differential value converted into an electric value during opening times of said on-off valve, said regulating member of said volume stream regulator comprising a first diaphragm valve with a diaphragm and a further diaphragm valve with a diaphragm and arranged as a cascade to said first diaphragm valve in series with the latter; a housing for said diaphragm valves; a throttle with which said regulating member is associated; a bistable adjusting member associated with said control valve of said on-off valve; a holding member through which said adjusting member holds said valve body of said control valve in its end positions; and an electromagnetic switching member which requires only a minimal electrical energy and through which said bistable adjusting member is connected with said signal generator and said electronic unit.

2. An arrangement as defined in claim 1, wherein said housing is a throughflow housing for the fluid stream, said on-off valve being formed as a diaphragm valve with a diaphragm, and being arranged together with both said diaphragm valves of said volume stream regulator one behind the other in said throughflow housing.

3. An arrangement as defined in claim 2, wherein said housing has a predetermined cross-section, said diaphragms of said volume stream regulator and of said on-off valve being substantially flat and having a small stiffness and a large diaphragm surface overlapping a greater part of said cross-section of said housing.

4. An arrangement as defined in claim 2; and further comprising a valve cover provided on said diaphragm of each of said diaphragm valves; a ring-shaped valve seat associated with said valve cover; and a spring acting on said valve cover.

5. An arrangement as defined in claim 2, wherein said diaphragms are composed of a resistant material and have low stiffness of less than 3 g per cm$^2$ of a diaphragm surface.

6. An arrangement as defined in claim 5, wherein said resistant material of said diaphragms is selected from the group consisting of EPDM and Viton.

7. An arrangement as defined in claim 1; and further comprising a throttle arranged to adjust the quantity of fluid passing through said volume stream regulator; said electronic unit being arranged to take into account the adjusted quantity of fluid during feed measurements.

8. An arrangement as defined in claim 7, wherein said throttle is formed as a variable throttle.

9. An arrangement as defined in claim 7, wherein said throttle is formed as an exchangeable throttle.

10. An arrangement as defined in claim 7, wherein said electronic unit takes into account the adjusted quantity of fluid in a positive manner.

11. An arrangement as defined in claim 10, wherein said thermostat is formed so that its command value or nominal value is automatically changeable over time in accordance with a predetermined value.

12. An arrangement as defined in claim 7, wherein said electronic unit takes into account the adjusted quantity fluid by adjusting in a coded form.

13. An arrangement as defined in claim 2, wherein said diaphragm valves of said volume stream regulator are arranged so that a pressure difference is formed at one of said diaphragm valves by the other of said diaphragm valves arranged before said one diaphragm valve and operating as a throttle.

14. An arrangement as defined in claim 1, wherein said on-off valve is formed as a diaphragm valve, said first-mentioned diaphragm valve and said on-off valve formed as a diaphragm valve being assembled together with said control valve and said bistable adjusting member so as to form a compact valve unit, said heating body having a heating body conduit, said valve unit being provided with heating body connections and arranged in said heating body conduit instead of a conventional heating body valve, said valve unit carrying a valve housing which accommodates said electronic unit; and further comprising indicating, adjusting and presetting elements also accommodated in said valve housing.

15. An arrangement as defined in claim 1, wherein said electronic unit has a regulating device, said signal generator being formed as a thermostat controllable by opening and closing of said on-off valve and regulating the fluid stream and thereby the temperature of the space, said thermostat being connected with said regulating device of said electronic unit.

16. An arrangement as defined in claim 1; and further comprising energy supply means formed as solar cells.

17. An arrangement as defined in claim 1; and further comprising energy supply means formed as semiconductor thermal elements for converting the energy of the fluid stream into electrical energy.

18. An arrangement as defined in claim 1; and further comprising a stream indicator for delivering a signal indicating a stream or a fluid stoppage to said electronic unit, which starts integration of a temperature difference value of said temperature sensor and stops the same.

19. An arrangement as defined in claim 18, wherein said stream indicator is formed as a contactless switch associated with said diaphragm valve.

20. An arrangement as defined in claim 1, wherein said volume stream regulator has a throttle which provides a pressure difference between the both sides of said diaphragm of said diaphragm valve and is formed as a sharp aperture.

21. An arrangement as defined in claim 1, wherein said holding member for said bistable adjusting member of said control valve for said on-off valve is formed as a permanent magnet.

22. An arrangement as defined in claim 1, wherein said holding member for said bistable adjusting member of said control valve for said on-off valve is formed as a auxiliary spring.

23. An arrangement as defined in claim 22, wherein said control valve has a valve closing body loaded in a closing position by said auxiliary spring; and further comprising a bistable electromagnetic switching member which has a movable armature fixedly connected with said valve closing body; and a permanent magnet forming a holding member for said valve closing body in an open position.

24. An arrangement as defined in claim 1, wherein said holding member for said bistable adjusting member of said control valve for said on-off valve is formed as a snap spring.

25. An arrangement as defined in claim 1; and further comprising a control chamber, a discharge, and an injection-like connection which leads from said control chamber to said discharge.

26. An arrangement as defined in claim 1, wherein said control valve has a through passage with a surface ratio relative to said aperture of said on-off valve between 5 and 10.

27. An arrangement as defined in claim 1, wherein said control valve has a connecting chamber, said on-off valve having an aperture to said connecting chamber of said control valve; and further comprising a filter arranged upstream of said aperture.

28. An arrangement as defined in claim 1, wherein said diaphragm has a peripheral region and is reliably and tightly clamped in said peripheral region; and further comprising a spring acting on said diaphragm, said spring being strained only in its proportional region and being electrochemically resistant.

29. An arrangement as defined in claim 28, wherein said peripheral region of said diaphragm is provided with a bead which is reliably and tightly clamped.

30. An arrangement as defined in claim 28, wherein said peripheral region of said diaphragm is reliably and tightly clamped by gluing.

31. An arrangement as defined in claim 28, wherein said peripheral region of said diaphragm is reliably and tightly clamped by vulcanization.

* * * * *